US009934078B2

(12) United States Patent
Guo et al.

(10) Patent No.: US 9,934,078 B2
(45) Date of Patent: Apr. 3, 2018

(54) COLLABORATIVE WORK OF APPLICATIONS

(75) Inventors: Liang Guo, Beijing (CN); Xu Qin Zhao, Beijing (CN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 634 days.

(21) Appl. No.: 13/350,910

(22) Filed: Jan. 16, 2012

(65) Prior Publication Data

US 2012/0198473 A1   Aug. 2, 2012

(30) Foreign Application Priority Data

Jan. 30, 2011   (CN) .......................... 2011 1 0032595

(51) Int. Cl.
*G06F 13/00* (2006.01)
*G06F 9/54* (2006.01)

(52) U.S. Cl.
CPC .................................. *G06F 9/543* (2013.01)

(58) Field of Classification Search
CPC .............................. G06F 9/542; H04L 29/06
USPC .................................................. 719/310, 318
See application file for complete search history.

(56) References Cited

U.S. PATENT DOCUMENTS

| | | | |
|---|---|---|---|
| 5,913,061 A * | 6/1999 | Gupta ........................ | G06F 9/54 718/101 |
| 6,195,685 B1 * | 2/2001 | Mukherjee et al. .......... | 709/205 |
| 7,043,696 B2 | 5/2006 | Santori et al. | |
| 7,234,111 B2 | 6/2007 | Chu et al. | |
| 7,340,426 B1 * | 3/2008 | Frutuoso et al. ............... | 705/37 |
| 7,478,407 B2 | 1/2009 | Jain et al. | |
| 2002/0147726 A1 * | 10/2002 | Yehia et al. ................... | 707/101 |
| 2003/0074090 A1 * | 4/2003 | Becka et al. .................... | 700/83 |
| 2003/0093479 A1 * | 5/2003 | Mellen-Garnett et al. ... | 709/205 |
| 2005/0138647 A1 * | 6/2005 | Bou-ghannam et al. ...... | 719/328 |
| 2005/0160361 A1 * | 7/2005 | Young ............................ | 715/513 |
| 2005/0216498 A1 * | 9/2005 | Georgalas et al. ........... | 707/102 |
| 2006/0064486 A1 * | 3/2006 | Baron et al. ................... | 709/224 |
| 2006/0074928 A1 | 4/2006 | MacLaurin et al. | |
| 2006/0230026 A1 | 10/2006 | Pereira | |
| 2006/0236328 A1 | 10/2006 | Dewitt | |

(Continued)

FOREIGN PATENT DOCUMENTS

| CN | 1695152 A | 11/2005 |
|---|---|---|
| CN | 101548256 A | 9/2009 |
| CN | 101739300 A | 6/2010 |

OTHER PUBLICATIONS

Grechanik, M., et al., "Integrating and Reusing GUI-Driven Applications," [online] Proceedings of the 7th Int'l. Conf. on Software Reuse: Methods, Techniques, and Tools ICSR-7, Apr. 2002, retrieved from the Internet: <http://citeseerx.ist.psu.edu/viewdoc/summary?doi=10.1.1.16.100>, 16 pgs.

(Continued)

*Primary Examiner* — Andy Ho
(74) *Attorney, Agent, or Firm* — Cuenot, Forsythe & Kim, LLC

(57) ABSTRACT

A method for collaborative work of applications can include reading a rule for defining a data transmission among collaborative working applications; initiating applications related to the rule; acquiring progress identifiers of the applications; and registering the progress identifiers of the applications.

18 Claims, 2 Drawing Sheets

(56) References Cited

U.S. PATENT DOCUMENTS

| | | |
|---|---|---|
| 2007/0118545 A1* | 5/2007 | Chandrasekharan et al. ............................. 707/101 |
| 2007/0143697 A1 | 6/2007 | Muller et al. |
| 2008/0146201 A1* | 6/2008 | O'Neill et al. ............ 455/414.1 |
| 2010/0251175 A1 | 9/2010 | Brunkhorst et al. |

OTHER PUBLICATIONS

Grance, T., et al., "The NIST Definition of Cloud Computing," [online] NIST, Pub. NIST SP-800-145, Sep. 28, 2011 [retrieved Apr. 18, 2012] retrieved from the Internet: <http://www.nist.gov/manuscript-publication-search.cfm?pub_id=909616>, 7 pgs.

* cited by examiner

COLLABORATIVE WORK OF APPLICATIONS

CROSS-REFERENCE TO RELATED APPLICATIONS

This application claims the benefit of China Application Number 201110032595.5 filed on Jan. 30, 2011, which is fully incorporated herein by reference.

BACKGROUND

The disclosure relates to the field of computers, and in particular, to collaborative work of applications.

As the range of computer applications widens, requirements of desktop applications by people becomes more and more varied. In order to satisfy the various requirements of desktop applications, increasingly, the functions of applications produced by desktop application providers continues to grow larger, the volume thereof becomes larger and larger, and the cost thereof becomes higher and higher. However, many users may only need part of the functions of an application. As desktop applications can be complicated, another problem is increased consumption of system resources by the desktop applications.

Among existing desktop applications, there are many light weight applications which are specific to a certain, or some general, function and occupy relatively fewer system resources. However, since the functions of these light weight applications are specific, many light weight applications may be needed to perform a complicated process; thus one must switch among different applications, input and convert respective data into the format as needed by other applications and the like, thereby reducing production efficiency.

BRIEF SUMMARY

The disclosure considers the above problems in the art, and provides embodiments capable of using existing light weight applications efficiently to collaborate work, which may coordinate a plurality of existing light weight user interfaces without changing existing applications.

According to an embodiment of the disclosure, there is provided a method for collaborative work of applications including reading a rule for defining a data transmission among collaborative working applications; initiating applications related to the rule; acquiring progress identifiers of the applications; and registering the progress identifiers of the applications.

According to another embodiment of the disclosure, there is provided a system for collaborative work of applications. The system can include a processor configured to perform executable operations including reading a rule for defining a data transmission among collaborative working applications; initiating applications related to the rule; acquiring progress identifiers of the applications; and registering the progress identifiers of the applications.

According to another embodiment of the disclosure, there is provided a computer program product for collaborative work of applications. The computer program product can include a computer readable storage medium having computer readable program code embodied therewith, that, when executed by a processor, implements operations. The operations can include reading a rule for defining a data transmission among collaborative working applications; initiating applications related to the rule; acquiring progress identifiers of the applications; and registering the progress identifiers of the applications.

With the disclosure, combinations of application functions complying with user requirements may be flexibly constructed by using elaborate, function specific, light weight applications, thereby reducing application complication greatly and lowering development cost. Collaborative work is implemented among existing light weight applications, thereby reducing switching among different applications, data output and format conversion, and improving production efficiency.

BRIEF DESCRIPTION OF THE SEVERAL VIEWS OF THE DRAWINGS

The invention may be better understood by combining the description referring to drawings below, in which the same or similar reference numbers represent the same or similar components throughout the drawings. The drawings are included within the description and constitute a part of the description along with the detailed description below, and are used to explain the preferred embodiments of the invention illustratively and illustrate the principal and advantage of the embodiments of the invention. In the drawings.

DETAILED DESCRIPTION

Figure 1:
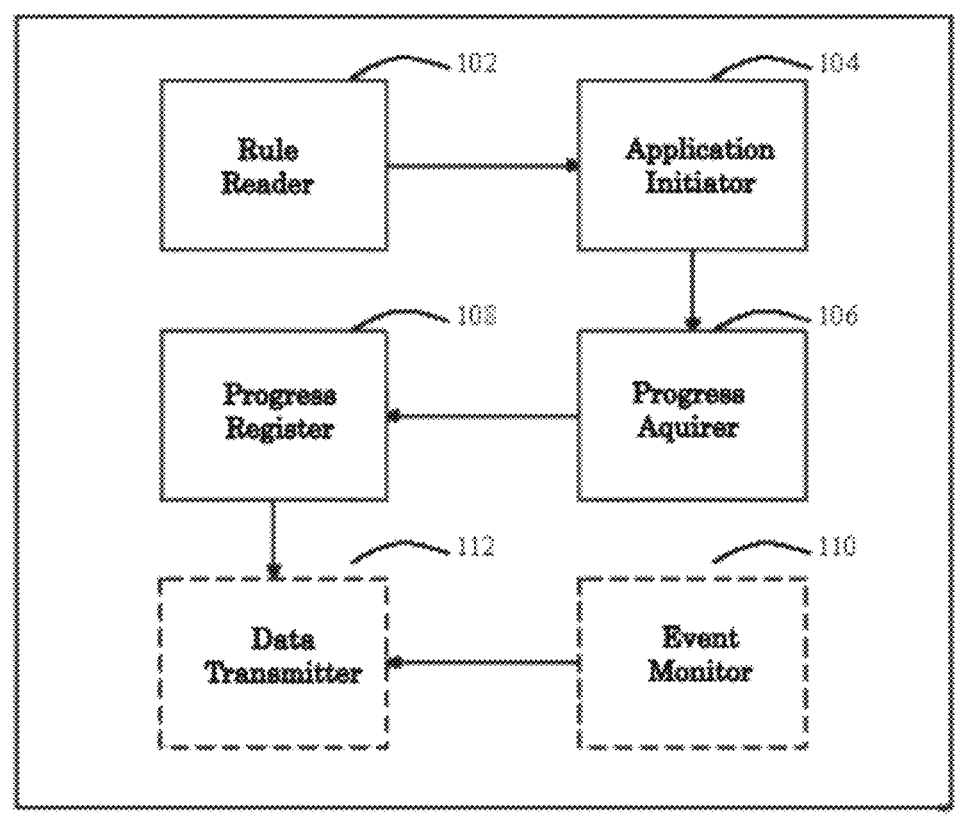
FIG. 1 shows a block diagram of a system 100 for collaborative work of applications according to an embodiment of the disclosure.

Illustrative embodiments of the invention are described below. In the interest of clarity, not all features of an actual implementation are described in this specification. It will of course be appreciated that in the development of any such actual embodiments, numerous implementation-specific decisions should be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

Here, note that, in order to avoid the invention being obscured by unnecessary details, only means, structures and/or process steps that are closely associated with the embodiments of the invention are illustrated in the drawings, and other details that have little relationship therewith are omitted.

In order to explain technical solutions of the disclosure, a system 100 for collaborative work of applications according to an embodiment of the disclosure is firstly described in conjunction with FIG. 1. An exemplary embodiment of the system 100 for collaborative work of applications is an application container which is used to contain at least one application for collaborative work. The system 100 may include, for example, rule reader 102 configured to read rules for defining data transmission among collaborative working applications; application initiator 104 configured to initiate applications related to rules; progress acquirer 106 configured to acquire progress identifiers of applications; and progress register 108 configured to register the progress identifiers of applications with system 100. Respective components of the system 100 will be described below.

Rule reader 102 is configured to read rules for defining data transmission among collaborative working applications. According to an embodiment of the disclosure, rules for defining data transmission among collaborative working applications can include events for triggering data transmission. According to an embodiment of the disclosure, events for triggering data transmission can include at least one action, and the action may be that a button is pressed, or an application window is activated, or the like, for example. According to an embodiment of the disclosure, rules of data transmission can include a source application and a target application related to a data transmission. An example of rules for defining data transmission among collaborative working applications is described taking Table 1 as an example.

TABLE 1

Rule table for defining data transmission among collaborative working applications

| Source application | | Target application | | | |
|---|---|---|---|---|---|
| Application name | Operation domain | Application name | Operation domain | Transmitted data type | Event of triggering data transmission |
| Calc.exe | 00000193 | Wordpad.exe | 0000E900 | text | Source application is in active state, and control button 00000070 (button'=') is pressed |
| Mspaint.exe | 00000000 | Wordpad.exe | 0000E900 | image | Source application is in active state, and window of target application is activated |

A rule table for defining data transmission among collaborative working applications as shown in Table 1 includes several domains and the meaning of respective domains will be introduced in sequence.

Source application: this domain defines a source application related to a data transmission and includes two subdomains: application name and operation domain. Application name is the name of the source application, and alternatively, it may also include a path, a version and other information of source application. Operation domain is an identifier of the operative area corresponding to source application in system 100.

Target application: this domain defines a target application related to a data transmission and includes two subdomains: application name and operation domain. Application name is the name of the target application, and alternatively, it may also include a path, a version and other information of target application. Operation domain is an identifier of the operative area corresponding to target application in system 100.

Transmitted data type: this domain defines a type of data transmission.

Event of triggering data transmission: this domain defines an event of triggering data transmission.

The brief description is based on two rules given in the example of the Table below. Taking the first rule as an example, this rule defines the following contents:

If the source application (i.e., Calc.exe) is currently in active state and control button 00000070 (i.e., button '=') is pressed, a data transmission from the source application to the target application is triggered, the type of the data transmission is text, the data transmission is from the operation domain (identifier is 00000193) of Calc.exe to the operation domain (identifier is 0000E900) of Wordpad.exe.

Similarly, the second rule defines that:

If the source application (i.e., Mspaint.exe) is currently in active state and window of the target application (i.e., window of Wordpad.exe) is activated, a data transmission from the source application to the target application is triggered, the type of the data transmission is image, the data transmission is from the operation domain (identifier is 00000000) of Mspaint.exe to the operation domain (identifier is 0000E900) of Wordpad.exe.

Application initiator 104 is configured to initiate applications related to rule(s). Application initiator 104 may acquire information of collaborative working applications related to rules according to the read rule for defining data transmission among collaborative working applications by rule reader 102; and the information may typically include application name, application path of these applications, and identifiers of these applications in operative areas of system 100 and the like. According to such information, application initiator 104 initiates applications related to the rule(s).

Progress acquirer 106 is configured to acquire progress identifiers of applications. After applications related to rules are initiated, there will be a progress identifier corresponding to it in the operating system which is used to uniquely identify the application. According to an embodiment of the disclosure, progress acquirer 106 may acquire progress identifiers of applications by a process management application of the operating system. The above illustration is only an example, and naturally, any other mechanisms in the art may also be used to acquire progress identifiers of applications.

Progress register 108 is configured to register the progress identifiers of applications with system 100. Only if progress identifier of an application acquired by the progress acquirer is registered with system 100, system 100 can use the progress identifier of the application to coordinate the collaborative work among respective applications. According to an embodiment of the disclosure, progress register 108 may register the progress identifiers of applications with the system by creating correspondence between progress identifiers of applications and operative areas of applications. The "operation domain" as shown in Table 1 is an example of the correspondence between progress identifiers of applications and operative areas of applications. Such correspondence may have various forms. For example, if a certain application has only one operative area or only uses one of its operative areas by default, this operation domain may be identified by a progress identifier, that is, the operation domain corresponds to the progress identifier. If a certain application has a plurality of operative areas, different operative areas may be identified by progress identifiers and identifiers of respective operative areas, that is, operation domains correspond to progress identifiers and identifiers of respective operative areas of the applications. The above illustration is only an example, and naturally, any other mechanism in the art may also be used to register the progress identifiers of applications with system 100.

FIG. 1 illustratively shows another embodiment of the disclosure. The system 100 for collaborative work of applications may also include other components indicated by dashed lines in FIG. 1.

As described above, rules for defining data transmission among collaborative working applications may include event(s) for triggering data transmission; according to another embodiment of the disclosure, the system 100 for collaborative work of applications may also include an event monitor 110 configured to monitor event(s) for triggering data transmission. Rules for defining data transmission among collaborative working applications may also include therein a source application and a target application related to data transmission. According to another embodiment of the disclosure, the system 100 for collaborative work of applications may also include a data transmitter 112 configured to initiate data transmission from the source application to the target application in response to the monitored event for triggering data transmission. According to another embodiment of the disclosure, the data transmitter 112 is further configured to find the operation domain of the source application based on a progress identifier of the source application related to a data transmission; find the operation domain of a target application based on the progress identifier of the target application related to a data transmission; and/or transmit data from a source application to a target application.

Figure 2:
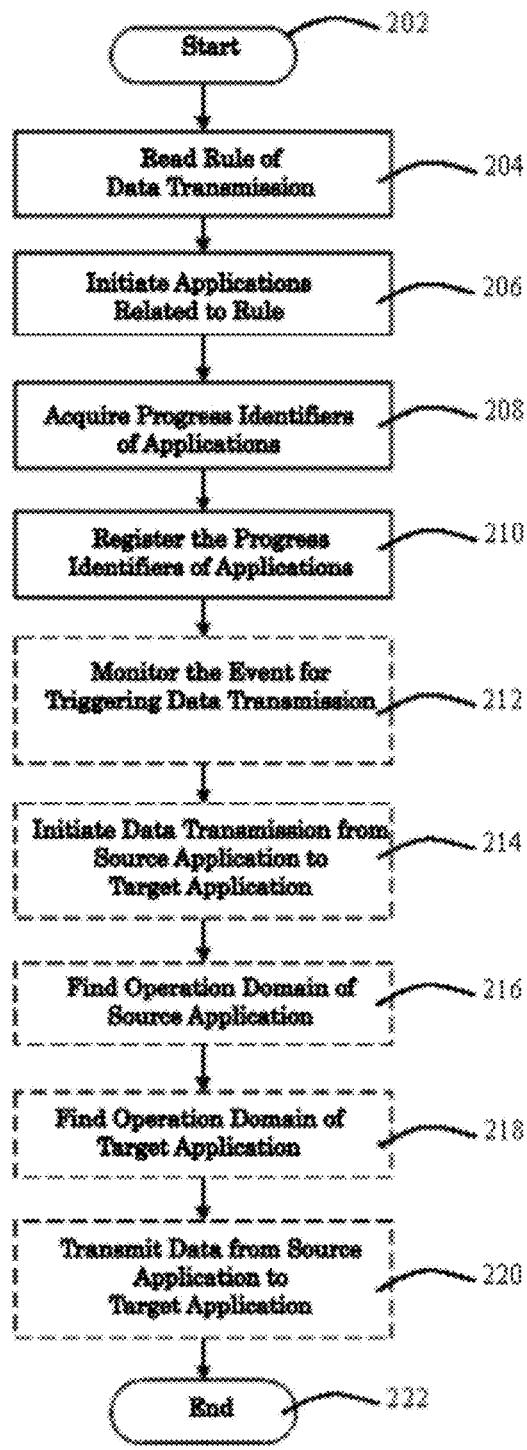
FIG. 2 shows a flowchart of a method 200 for collaborative work of applications according to another embodiment of the disclosure.

A method 200 for collaborative work of applications according to an embodiment of the disclosure is described below in conjunction with FIG. 2. The method 200 for collaborative work of applications as shown in FIG. 2 starts with step 202. Next, the method 200 proceeds to step 204 of reading a rule for defining a data transmission among collaborative working applications. According to an embodiment of the disclosure, a rule for defining a data transmission among collaborative working applications includes an event for triggering the data transmission. According to an embodiment of the disclosure, the event for triggering the data transmission includes at least one action. According to an embodiment of the disclosure, a rule of data transmission includes a source application and a target application related to the data transmission. The example of a rule for defining data transmission among collaborative working applications has been introduced before, and will not be repeated.

Next, the method 200 proceeds to step 206 of initiating applications related to the rule. Collaborative working applications related to the rule may be acquired according to the read rule for defining a data transmission among collaborative working applications by rule reader 102; and the information may typically include application name, application paths of these applications, and identifiers of operative areas in these applications in operative areas of system 100 and the like. According to such information, applications related to the rule are initiated.

Next, the method 200 proceeds to step 208 of acquiring progress identifiers of applications. After applications related to the rule are initiated, there will be a progress identifier corresponding to it in the operating system which is used to uniquely identify the application. According to an embodiment of the disclosure, progress identifiers of applications may be acquired by a process management application of the operating system. The above illustration is only an example, and naturally, any other techniques in the art may also be used to acquire progress identifiers of applications.

Next, the method 200 proceeds to step 210 of registering the progress identifiers of applications. Only if the acquired progress identifier of an application is registered, can the progress identifier of the application can be used to coordinate the collaborative work among respective applications. According to an embodiment of the disclosure, the progress identifiers of applications may be registered by creating correspondence between progress identifiers of applications and operative areas of applications. The "operation domain" as shown in Table 1 is an example of the correspondence between progress identifiers of applications and operative areas of applications. Such correspondence may have various forms. For example, if a certain application has only one operative area or only uses one of its operative areas by default, this operation domain may be identified by a progress identifier, that is, the operation domain corresponds to the progress identifier. If a certain application has a plurality of operative areas, different operative areas may be identified by progress identifiers and identifiers of respective operative areas, that is, operation domains can correspond to progress identifiers and identifiers of respective operative areas of the applications. The above illustration is only an example, and naturally, any other techniques in the art may also be used to register the progress identifiers of applications.

FIG. 2 illustratively shows another embodiment of the disclosure. The method 200, which ends at step 222, for collaborative work of applications may also include other steps indicated by dashed lines in FIG. 2.

As described above, a rule for defining a data transmission among collaborative working applications may include an event for triggering the data transmission; according to another embodiment of the disclosure, the method 200 for collaborative work of applications may also include step 212 of monitoring the event for triggering the data transmission. A rule for defining the data transmission among collaborative working applications may also include therein the source application and the target application related to the data transmission. According to another embodiment of the disclosure, the method 100 for collaborative work of applications may also include step 214 of initiating the data transmission from the source application to the target application in response to the monitored event for triggering data transmission. According to another embodiment of the disclosure, the data transmission from the source application to the target application further includes the step 216 of finding the operation domain of the source application based on the progress identifier of the source application related to the data transmission; step 218 of finding the operation domain of the target application based on the progress identifier of the target application related to the data transmission; and step 220 of transmitting data from the source application to the target application.

The embodiment of the disclosure will be further described in conjunction with the rule as shown in Table 1. It should be noted that, this is only intended for illustration and is not intended to limit the scope of the claims.

Assuming that the current application is Calc.exe (i.e., the current application is in active state), when event monitor 110 monitors that the action of control button 00000070 (i.e., button '=') being pressed occurs, the first rule in Table 1 indicates that the event for triggering data transmission is monitored. At this time, in response to the monitored event for triggering data transmission, data transmitter 112 initiates data transmission from Calc.exe to Wordpad.exe according to the first rule in Table 1. This procedure may be briefly described as follows.

According to the first rule in Table 1, data transmitter 112 acquires, e.g., determines, that data type to be transmitted is text. Further, according to the first rule in Table 1, data transmitter 112 acquires, e.g., determines, the source application and the target application related to the data transmission; then, data transmitter 112 finds the operation domain of the source application based on the progress identifier of the source application related to the data transmission (identifier is 00000193); and finds the operation domain of the target application based on the progress identifier of the target application related to the data transmission (identifier is 0000E900); and then data transmitter 112 transmits data from the source application to the target application.

The basic principal is described above by incorporating specific embodiments; however, it should be noted that, those skilled in the art can appreciated that the methods and apparatuses of the disclosure or any step or means may be implemented in any computing means (including processor, storage medium etc.) or network of computer means in a combination of hardware and firmware/software, and this can be achieved for those skilled in the art after reading the description of the disclosure using programming skills of one skilled in the art.

A computing system, for example, can include at least one processor coupled to memory elements through a system bus or other suitable circuitry. As such, the computing system can store program code within memory elements. The processor can execute the program code accessed from the memory elements via a system bus. In one aspect, for example, the computing system can be implemented as computer that is suitable for storing and/or executing program code. It should be appreciated, however, that the computing system can be implemented in the form of any system including a processor and memory that is capable of performing the functions and/or operations described within this specification.

The memory elements can include one or more physical memory devices such as, for example, local memory and one or more bulk storage devices. The local memory refers to random access memory or other non-persistent memory device(s) generally used during actual execution of the program code. The bulk storage device(s) can be implemented as a hard drive or other persistent data storage device. The computing system also can include one or more cache memories (not shown) that provide temporary storage of at least some program code in order to reduce the number of times program code must be retrieved from bulk storage device during execution.

The input/output (I/O) devices such as a keyboard, a display, and a pointing device optionally can be coupled to the computing system. The I/O devices can be coupled to the computing system either directly or through intervening I/O controllers. One or more network adapters also can be coupled to the computing system to enable the computing system to become coupled to other systems, computer systems, remote printers, and/or remote storage devices through intervening private or public networks. Modems, cable modems, and Ethernet cards are examples of different types of network adapters that can be used with the computing system.

Thus, the purpose of the disclosure may be implemented by running a program or a set of programs on any computing means. The computing means may be known general means. Thus, the purpose of the disclosure may be implemented by providing a computer program product which contains program code for implementing the method or apparatus only. That is, such a computer program product can constitute the disclosure, and storage medium in which such program product is stored can also constitute the disclosure. The storage medium may be any known storage medium or any storage medium that will be developed in future.

A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk drive (HDD), a solid state drive (SSD), a random access memory (RAM), a read-only memory (ROM), an erasable programmable read-only memory (EPROM or Flash memory), an optical fiber, a portable compact disc read-only memory (CD-ROM), a digital versatile disc (DVD), an optical storage device, a magnetic storage device, or any suitable combination of the foregoing. In the context of this document, a computer readable storage medium may be any tangible, e.g., non-transitory, medium that can contain, or store a program for use by or in connection with an instruction execution system, apparatus, or device.

It will be noted that, in the embodiments of the disclosure, respective means and steps can be decomposed and/or recombined. Such decomposition and/or recombination should be viewed as an equivalent solution of the disclosure. Further, steps for performing a series of processes above may be performed according the mentioned order naturally in time sequence, but not necessarily in time sequence. Some steps may be performed in parallel, independently, or in reverse order.

Although the disclosure and its benefits have been described in detail, it should be appreciated that various modifications, replacements and changes may be made without departing from the spirit and scope defined by the appended claims. Further, terms herein "including", "containing" or any other variants are intended to encompass inclusion non-exclusively, thus process, method, article or means containing a series of elements include not only those elements, but can include others not listed explicitly, otherwise those inherent to such process, method, article or means. Without further limitation, elements that are defined by the phrase "including a . . . " do not exclude other same elements that exist in the process, method, article or means of the elements.

The invention claimed is:

1. A computer-implemented method within a computer hardware system, comprising:
 executing a source application;
 executing a target application;
 reading, from a rule table including a plurality of rules, a rule, and the rule including:
  an identification of the source application,
  an identification of the target application,
  a transmitted data type, and
  a description of an event that triggers a data transmission, from the source application to the target application, of the transmitted data type;
 monitoring the computer hardware system for an event;

detecting the event;
comparing the detected event to the description of the event that triggers the data transmission; and
initiating, based upon a match between the detected event and the description, the data transmission from the source application to the target application.

2. The method of claim 1, further comprising
registering, with a register, an identifier of the source application and an identifier of the target application, wherein
the monitoring is based upon the registered identifiers.

3. The method of claim 1, wherein
the rule includes an operation domain associated with the source application and an operation domain associated with the target application.

4. The method of claim 1, wherein
the description of the event includes a required state of the source application.

5. The method of claim 1, wherein
the identification of the source application includes a name of the source application, and
the identification of the target application includes a name of the target application.

6. The method of claim 5, wherein
the identification of the source application further includes at least one of a path and a version of the source application, and
the identification of the target application further includes at least one of a path and a version of the target application.

7. A computer hardware system, comprising:
a hardware processor configured to initiate the following executable operations:
    executing a source application;
    executing a target application;
    reading, from a rule table including a plurality of rules, and the rule including:
        an identification of the source application,
        an identification of the target application,
        a transmitted data type, and
        a description of an event that triggers a data transmission, from the source application to the target application, of the transmitted data type;
    monitoring the computer hardware system for an event;
    detecting the event;
    comparing the detected event to the description of the event that triggers the data transmission; and
    initiating, based upon a match between the detected event and the description, the data transmission from the source application to the target application.

8. The system of claim 7, wherein the hardware processor is further configured to initiate the following executable operation:
    registering, with a register, an identifier of the source application and an identifier of the target application, wherein
    the monitoring is based upon the registered identifiers.

9. The system of claim 7, wherein
the rule includes an operation domain associated with the source application and an operation domain associated with the target application.

10. The system of claim 7, wherein
the description of the event includes a required state of the source application.

11. The system of claim 7, wherein
the identification of the source application includes a name of the source application, and
the identification of the target application includes a name of the target application.

12. The system of claim 11, wherein
the identification of the source application further includes at least one of a path and a version of the source application, and
the identification of the target application further includes at least one of a path and a version of the target application.

13. A computer program product, comprising:
a computer hardware storage device having computer readable program code embodied therein,
the computer readable program code, which when executed by a computer hardware system, causes the computer hardware system to perform:
    executing a source application;
    executing a target application;
    reading, from a rule table including a plurality of rules, and the rule including:
        an identification of the source application,
        an identification of the target application,
        a transmitted data type, and
        a description of an event that triggers a data transmission, from the source application to the target application, of the transmitted data type;
    monitoring the computer hardware system for an event;
    detecting the event;
    comparing the detected event to the description of the event that triggers the data transmission; and
    initiating, based upon a match between the detected event and the description, the data transmission from the source application to the target application.

14. The computer program product of claim 13, wherein the computer readable program code further causes the computer hardware system to perform:
    registering, with a register, an identifier of the source application and an identifier of the target application, wherein
    the monitoring is based upon the registered identifiers.

15. The computer program product of claim 13, wherein
the rule includes an operation domain associated with the source application and an operation domain associated with the target application.

16. The computer program product of claim 13, wherein
the description of the event includes a required state of the source application.

17. The computer program product of claim 13, wherein
the identification of the source application includes a name of the source application, and
the identification of the target application includes a name of the target application.

18. The computer program product of claim 17, wherein
the identification of the source application further includes at least one of a path and a version of the source application, and
the identification of the target application further includes at least one of a path and a version of the target application.

* * * * *